(12) United States Patent
Hirotsu et al.

(10) Patent No.: US 8,095,825 B2
(45) Date of Patent: Jan. 10, 2012

(54) ERROR CORRECTION METHOD WITH INSTRUCTION LEVEL ROLLBACK

(75) Inventors: Teppei Hirotsu, Hitachi (JP); Hiromichi Yamada, Hitachi (JP); Teruaki Sakata, Hitachi (JP); Kesami Hagiwara, Koganei (JP)

(73) Assignee: Renesas Electronics Corporation, Kanagawa (JP)

( * ) Notice: Subject to any disclaimer, the term of this patent is extended or adjusted under 35 U.S.C. 154(b) by 632 days.

(21) Appl. No.: 11/623,441

(22) Filed: Jan. 16, 2007

(65) Prior Publication Data
US 2007/0180317 A1 Aug. 2, 2007

(30) Foreign Application Priority Data
Jan. 16, 2006 (JP) ................... 2006-006921

(51) Int. Cl.
G06F 11/00 (2006.01)
G06F 11/10 (2006.01)

(52) U.S. Cl. .............. 714/17; 714/15; 714/16; 714/21
(58) Field of Classification Search .............. 714/17, 714/15, 16, 19, 21
See application file for complete search history.

(56) References Cited

U.S. PATENT DOCUMENTS

| | | | | |
|---|---|---|---|---|
| 3,736,566 A * | 5/1973 | Anderson et al. | ............... | 714/15 |
| 4,253,183 A * | 2/1981 | Taylor et al. | ............... | 714/27 |
| 4,538,265 A * | 8/1985 | Day et al. | ............... | 714/17 |
| 4,783,783 A * | 11/1988 | Nagai et al. | ............... | 714/17 |
| 5,321,698 A * | 6/1994 | Nguyen et al. | ............... | 714/17 |
| 6,247,118 B1 * | 6/2001 | Zumkehr et al. | ............... | 712/228 |
| 6,625,756 B1 * | 9/2003 | Grochowski et al. | ............... | 714/17 |
| 7,085,955 B2 * | 8/2006 | Prabhu | ............... | 714/6.1 |
| 7,100,027 B1 * | 8/2006 | Padwekar | ............... | 712/227 |
| 7,308,607 B2 * | 12/2007 | Reinhardt et al. | ............... | 714/25 |
| 7,320,091 B2 * | 1/2008 | Blaauw et al. | ............... | 714/30 |
| 7,415,633 B2 * | 8/2008 | Jamil et al. | ............... | 714/17 |
| 7,478,276 B2 * | 1/2009 | Bishop et al. | ............... | 714/13 |
| 7,607,042 B2 * | 10/2009 | Ferren et al. | ............... | 714/21 |
| 2001/0025338 A1 * | 9/2001 | Zumkehr et al. | ............... | 712/228 |

(Continued)

FOREIGN PATENT DOCUMENTS
JP 59-174952 10/1984
(Continued)

OTHER PUBLICATIONS

Why all Reset Signals are Active Low, by Ashok Prabhu Masilamani Mar. 5, 2001 http://www.qsl.net/wb6tpu/si-list/0030.html.*

(Continued)

*Primary Examiner* — Joseph Schell
(74) *Attorney, Agent, or Firm* — Antonelli, Terry, Stout & Kraus, LLP.

(57) ABSTRACT

This method is an error correction method such that, when an error is detected in a CPU with pipeline structure, a content of a register file is restored by a delayed register file which holds an execute completion state of an [Instruction N] correctly executed before this error, and a rollback control that re-executes an instruction from the [Instruction N+1] which is the next instruction of the [Instruction N] is performed. The method collects a parity check result of arbitrary Flip-Flops existing inside the CPU, and detects an error. As a result, the content of the register file is restored into the instruction execute completion state preceding to the instruction range likely to malfunction by the error, and the instruction can be roll backed from the beginning of the instruction range likely having malfunctioned by the error.

9 Claims, 9 Drawing Sheets

U.S. PATENT DOCUMENTS

2006/0271820 A1*  11/2006  Mack et al. ..................... 714/17
2006/0277434 A1*  12/2006  Tsern et al. ..................... 714/17

FOREIGN PATENT DOCUMENTS

| | | |
|---|---|---|
| JP | 06-161797 | 6/1994 |
| JP | 06-195235 | 7/1994 |
| JP | 11-327940 | 11/1999 |
| JP | 2004-062309 | 2/2004 |

OTHER PUBLICATIONS

Office Action in Japan Patent Appln. 2006-006921, mailed Sep. 28, 2010 (in Japanese) [3 pgs.].

Office Action in JP 2006-006921, dated Aug. 30, 2011, (in Japanese, 5 pgs.).

English language translation of Office Action in JP 2006-006921, dated Aug. 30, 2011.

* cited by examiner

ERROR CORRECTION METHOD WITH INSTRUCTION LEVEL ROLLBACK

CROSS-REFERENCE TO RELATED APPLICATION

The present application claims priority from Japanese patent application No. JP 2006-006921 filed on Jan. 16, 2006, the content of which is hereby incorporated by reference into this application.

TECHNICAL FIELD OF THE INVENTION

The present invention relates to an error correction technique of performing a rollback control, and in particular, it relates to a technique effective in application to an error correction method of a CPU by an instruction level rollback in the CPU with pipeline structure.

BACKGROUND OF THE INVENTION

For example, the CPU sometimes malfunctions by errors temporarily reversing the bit data of a memory element such as a Flip-Flop due to the effect of cosmic radiation. In order to correct these errors, when an error is detected, the content of a register file is restored from a delayed register file, which holds an execute completion state of an [Instruction N] correctly executed before this error, and the rollback control that re-executes an instruction from the next instruction [Instruction N+1] of the [Instruction N] is performed.

For example, Japanese Patent Laid-Open Publication No. 2004-62309 (Patent Document 1) discloses a system that performs rollback from the previous instruction of an illegal instruction when the illegal instruction including an error is detected.

Now, according to the technique disclosed in the Patent Document 1, the detection range of errors is limited by an instruction fetch unit, so, when an error occurs in the other part of the CPU, there is a problem that the error is unable to be corrected by rollback. Further, when an error of the CPU is propagated to a rollback control unit, there is a problem that a rollback process itself malfunctions. Moreover, when control registers at a peripheral module such as a built-in RAM and DMA controller are written with wrong values by the error of the CPU, there are problems that corrections by rollback are impossible and the peripheral module malfunctions.

SUMMARY OF THE INVENTION

Therefore, it is an object of the present invention to solve these problems, and to provide an error correction method of a CPU using a rollback which is simple and have wide correctable range.

These and other objects and unique features of the present invention will be apparent upon reading a description of the present specification and the accompanied drawings.

The outline of a representative example among the aspects of the invention disclosed in the present application will be simply described as follows.

The invention is applied to an error correction method, wherein, when an error is detected in a CPU with pipeline structure, the content of a register file is restored from a delayed register file, which holds an execute completion state of an [Instruction N] correctly executed before this error, and a rollback control that re-executes an instruction from a [Instruction N+1] which is the next instruction the [Instruction N], and has following features.

(1) The invention is characterized in that a parity check result of arbitrary Flip-Flops in the CPU is collected so as to detect an error. And, the [Instruction N+1] is characterized by being an instruction which the CPU decoded first among at least one or more instructions being executed at the timing on which the error occurs.

(2) The invention is characterized in that a CPU signal inputted to the rollback control unit which performs the rollback control nullifies a CPU signal delayed by a latency of the error detection signal using an error detection signal, and an output delay of the error detection signal is adjusted to be less than the minimum value of the output delay of the CPU signal.

(3) The invention is characterized in that, when an error exists in a CPU bus write accompanied with the execution of instructions subsequent to a occurrence of the error, the error is detected and the CPU bus write is cancelled. Moreover, an instruction generating the content of a source operand is disposed before the instruction accompanied with the CPU bus write so that the source operand of the instruction accompanied with the CPU bus write is reflected on the delayed register file before the CPU bus write, and the error of the CPU bus write is detected using the read value of the delayed register file, and cancelled.

From among the aspects of the invention disclosed in the present application, the effect obtained by a representative aspect will be simply described as follows.

According to the present invention, corresponding to the means (1), (2), and (3) to solve the problems, the following effects such as (1), (2), and (3) can be obtained.

(1) An arbitrary error inside the CPU is detected by a simple control, and the content of the register file is restored into the instruction execute completion state preceding to the instruction range likely having malfunctioned by the error, and a rollback of instructions can be executed from the beginning of the instruction range likely having malfunctioned by the error.

(2) Propagation of the error of the CPU to the rollback control unit and malfunctioning of the rollback thereby can be prevented.

(3) An erroneous write on the CPU bus by the error of the CPU can be prevented by a simple control.

DESCRIPTION OF THE PREFERRED EMBODIMENTS

An embodiment of the present invention will be described below in detail based on the drawings. In all the drawings to explain the embodiment, the same reference number will be attached to the same member in principle, and the repeated description thereof will be omitted.

Figure 1:
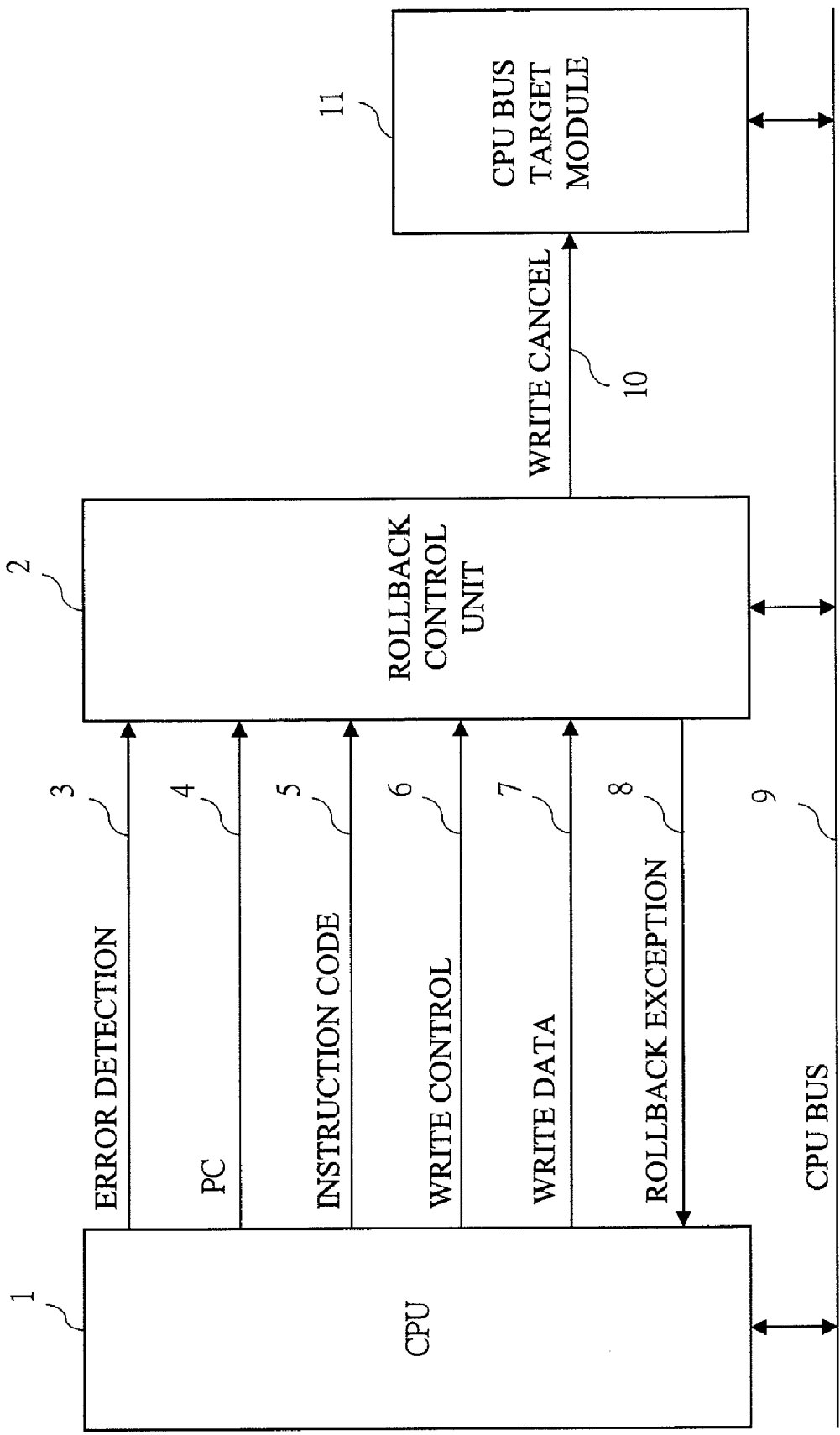
FIG. 1 is a general view showing an information processing unit having an error correction function which is one embodiment of the present invention.

First, referring to FIG. 1, one example of an information processing unit having an error correction function, which is one embodiment of the present invention, will be described. FIG. 1 is a general view showing the information processing unit having the error correction function.

The information processing unit of the present embodiment is configured by a CPU with pipeline structure (1), a rollback control unit (2) that performs a rollback control, a CPU bus target module (11), and the like, and these elements are mutually connected through a CPU bus (9).

The CPU (1) performs instruction fetch, read and write of data through the CPU bus (9), and executes programs. The CPU (1) in the present embodiment performs a five stage pipeline processing consisting of an IF stage that fetches the instructions, a D stage that decodes the instructions, an EX stage that performs execute of the instructions and an address output on the CPU bus, a MA stage that performs a write data output to the CPU bus and read data input from the CPU bus, and a WB stage that writes back the result of instruction execute to the register.

The rollback control unit (2) inputs an error detection (3) showing the error occurrence inside the CPU, a PC (4) showing the address of the instructions existing in an IF stage, an instruction code (5) existing in the IF stage, a write control (6) designating a register which is a write back target in the WB stage, a write data (7) to be written back to the register in the WB stage, and outputs a rollback exception (8) for requesting a branch to rollback exception routine to the CPU (1) and a write cancel (10) that cancels the CPU bus write to a CPU bus target module (11) which is connected to a CPU bus (9), and performs a rollback control and a cancel of the CPU bus write.

Particularly, this information processing unit, when an error is detected in the CPU (1), has an error correction function including a rollback control function. When an error is detected in the CPU (1), the rollback control function restores the content of the register file from the delayed register file which holds the execute completion state of the [instruction N] correctly executed preceding to this error and re-execute the instruction from the [instruction N+1] which is the next instruction of the [instruction N]. The detail will be described later.

Figure 2:
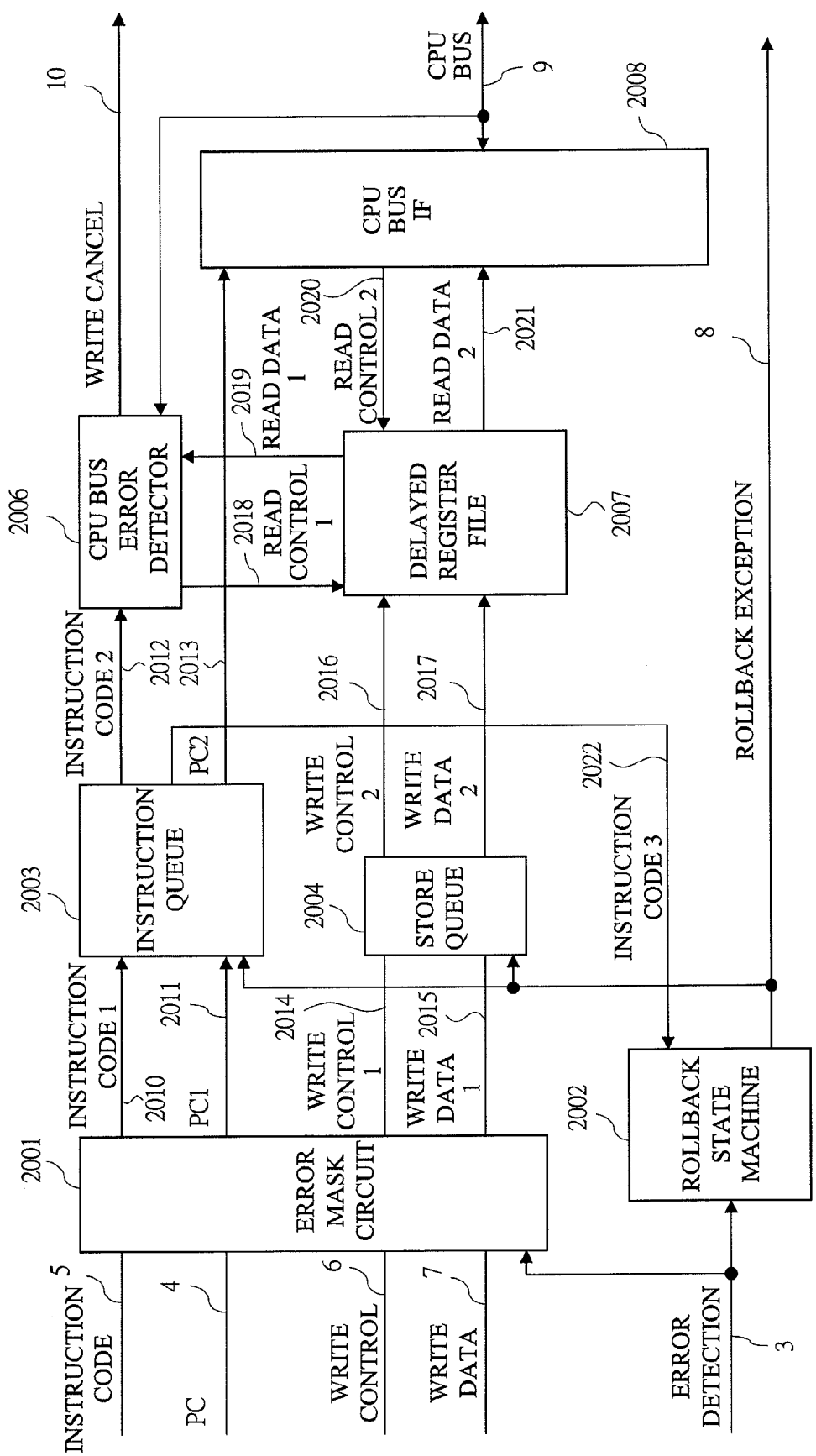
FIG. 2 is a detailed view showing a rollback control unit in one embodiment of the present invention.

Subsequently, referring to FIG. 2, the detail of the rollback control unit (2) will be described. FIG. 2 is a detailed view showing the rollback control unit (2).

The rollback control unit (2) is configured by an error mask circuit (2001), a rollback state machine (2002), an instruction queue (2003), a store queue (2004), a CPU bus error detector (2006), a delayed register file (2007), and a CPU bus IF (2008), and the like.

The error mask circuit (2001) masks errors of the instruction code (5), the PC (4), the write control (6), and the write data (7) by using the error detection (3), and output them to an instruction code 1 (2010), a PC 1 (2011), a write control 1 (2014), and a write data 1 (2015), respectively.

The instruction queue (2003) delays the instruction code 1 (2010), and outputs an instruction code 2 (2012) and an instruction code 3 (2022). Further, the instruction queue (2003) delays the PC 1 (2011), and outputs a PC 2 (2013).

The store queue (2004) delays the write control 1 (2014) and the write data 1 (2015), and output them to a write control 2 (2016) and a write data 2 (2017), respectively.

The CPU bus error detector (2006) decodes the instruction code 2 (2012), and reads the content of the delayed register file (2007) from a read data 1 (2019) by using a read control 1 (2018), and compares its read content with an address and data outputted to the CPU bus (9), and when a mismatch is found, asserts the write cancel (10).

The delayed register file (2007) is a replica of the register file including a general purpose register, a control register and a flag resister of the CPU and the like, and holds the content of the past register files for the rollback. For the delayed register file (2007), the data of the write data 2 (2017) is written in the register pointed by the write control 2 (2016). Further, from the delayed register file (2007), the content of the register pointed by the read control 1 (2018) is read by the read data 1 (2019), and the content of the register pointed by a read control 2 (2020) is read by a read data 1 (2021), respectively.

The rollback state machine (2002) holds a state necessary for the rollback control, and the transition between each state is decided by the error detection (3) and an instruction code 3 (2022). Further, corresponding to the state of the rollback state machine, the rollback exception (8) is asserted.

The instruction queue (2003) and the delayed register file (2007) are mapped to a specific address, and can be accessed from the CPU through the CPU bus (9) and the CPU bus IF (2008). From the instruction queue (2003), the PC 2 (2013) can be read, and from the delayed register file (2007), the content of the arbitrary register can be read.

Figure 3:
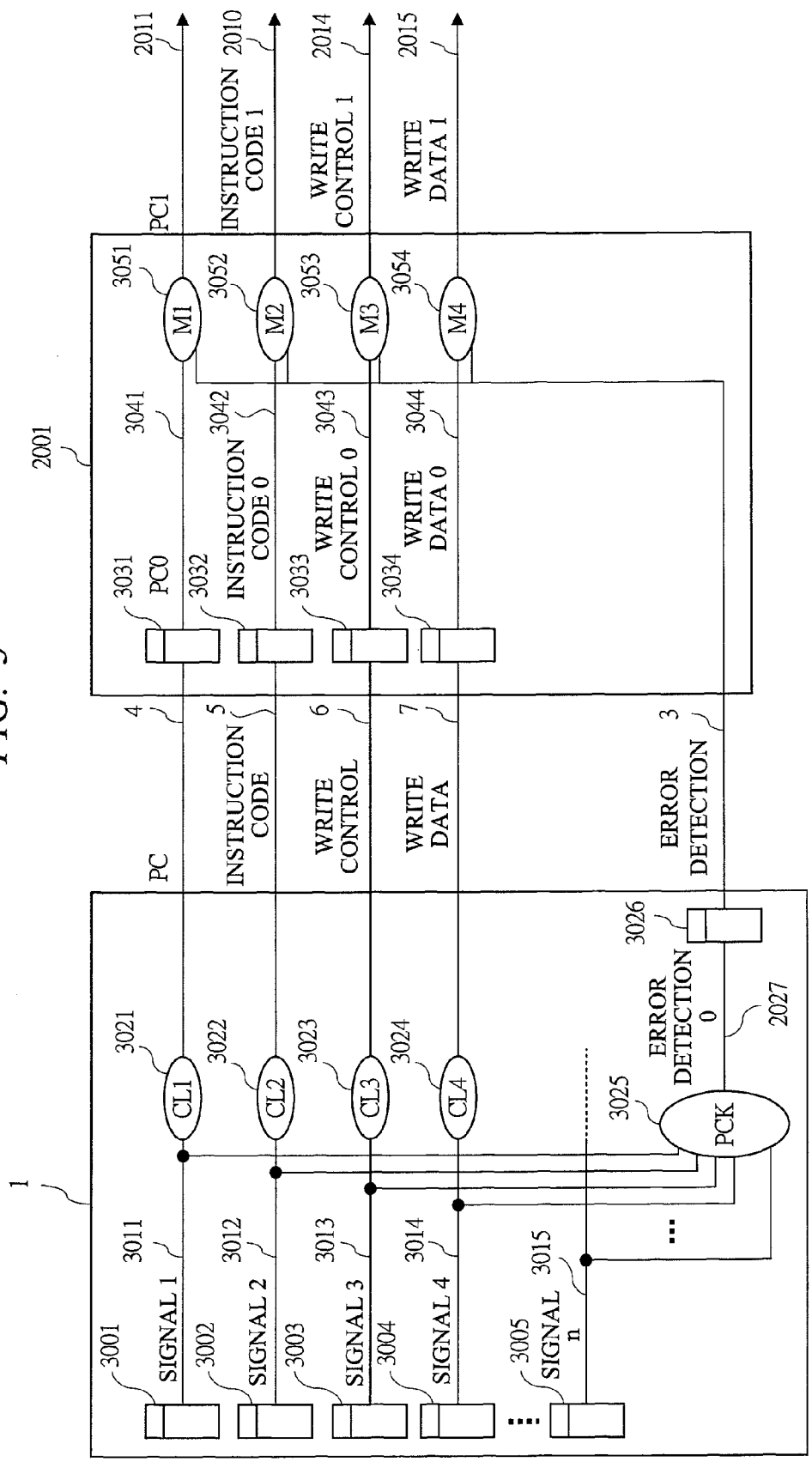
FIG. 3 is a detailed view showing an output unit of a CPU and an error mask circuit of in one embodiment of the present invention.

Subsequently, referring to FIG. 3, the details of the output unit of the CPU (1) and the error mask circuit (2001) will be descried. FIG. 3 is a detail view showing the output unit of CPU (1) and the error mask circuit (2001).

The output unit of the CPU (1) is configured by FFs (3001 to 3005), combinational logic circuits CL1 to CL4 (3021 to 3024), a parity check circuit PCK (3025), a FF (3026) and the like. Further, the error mask circuit (2001) is configured by FFs (3031 to 3034), mask logic M1 to M4 (3051 to 3054), and the like. From the output unit of the CPU (1), the PC (4), the instruction code (5), the write control (6), the write data (7), and the error detection (3) are inputted to the error mask circuit (2001).

In the output unit of the CPU (1), a signal 1 (3011), a signal 2 (3012), a signal 3 (3013), and a signal 4 (3014) outputted from the FF (3001), the FF (3002), the FF (3003), and the FF (3004), respectively become the PC (4), the instruction code (5), the write control (6), and the write data (7), respectively through the combinational circuit CL1 (3021), the CL2 (3022), the CL3 (3023), and the CL4 (3024), respectively.

The signal 1 (3011), the signal 2 (3012), the signal 3 (3013), the signal 4 (3014), and a signal n (3015), respectively which are the outputs of the FF (3001), the FF (3002), the FF (3003), the FF (3004) and an arbitrary FF (3005) inside the CPU are inputted to the parity check circuit PCK (3025) and the PCK (3025) collects the parity check results (1: errors exist, 0: no error exists) of each signal by logical add, and outputs it to an error detection 0 (2027). By this configuration, the error detection 0 (2027) becomes 1 when an error occurs on any one of the arbitrary FFs inside the CPU. The error detection 0 (2027) is inputted to an FF (3026), and the FF (3026) outputs the error detection (3).

Here, when the minimum value of the delay of the CL1 (3021), the CL2 (3022), the CL3 (3023), and the CL4 (3024) is taken as DCL_MIN, and the delay of the PCK (3025) is taken as DPCK, the delay is adjusted so that the DPCK is less than or equal to DCL_MIN.

In the error mask circuit (2001), the PC (4), the instruction code (5), the write control (6), and the write data (7) are inputted to the FF (3031), the FF (3032), the FF (3033), and the FF (3034) respectively, and a PC0 (3041), an instruction code 0 (3042), a write control 0 (3043), and a write data 0 (3044) are outputted. The PC0 (3041), the instruction code 0 (3042), the write control 0 (3043), and the write data 0 (3044) becomes the PC 1 (2011), the instruction code 1 (2010), the write control 1 (2014), and the write data 1 (2015) through the mask logic M1 (3051), the M2 (3052), the M3 (3053), and the M4 (3054), respectively.

When the error detection (3) is 1, the mask logic M1 (3051), the M2 (3052), the M3 (3053), and the M4 (3054) make the PC 1 (2011), the instruction code 1 (2010), the write control 1 (2014), and the write data 1 (2015) into invalid values. For example, when the error detection (3) is "1", the instruction code 1 (2010) is converted into a code corresponding to a NO (No Operation) instruction, which performs no processing.

By the above described configuration, an error propagation from the CPU (1) to the rollback control unit (2) is inhibited, and the malfunction of the rollback unit (2) can be prevented.

Figure 4:
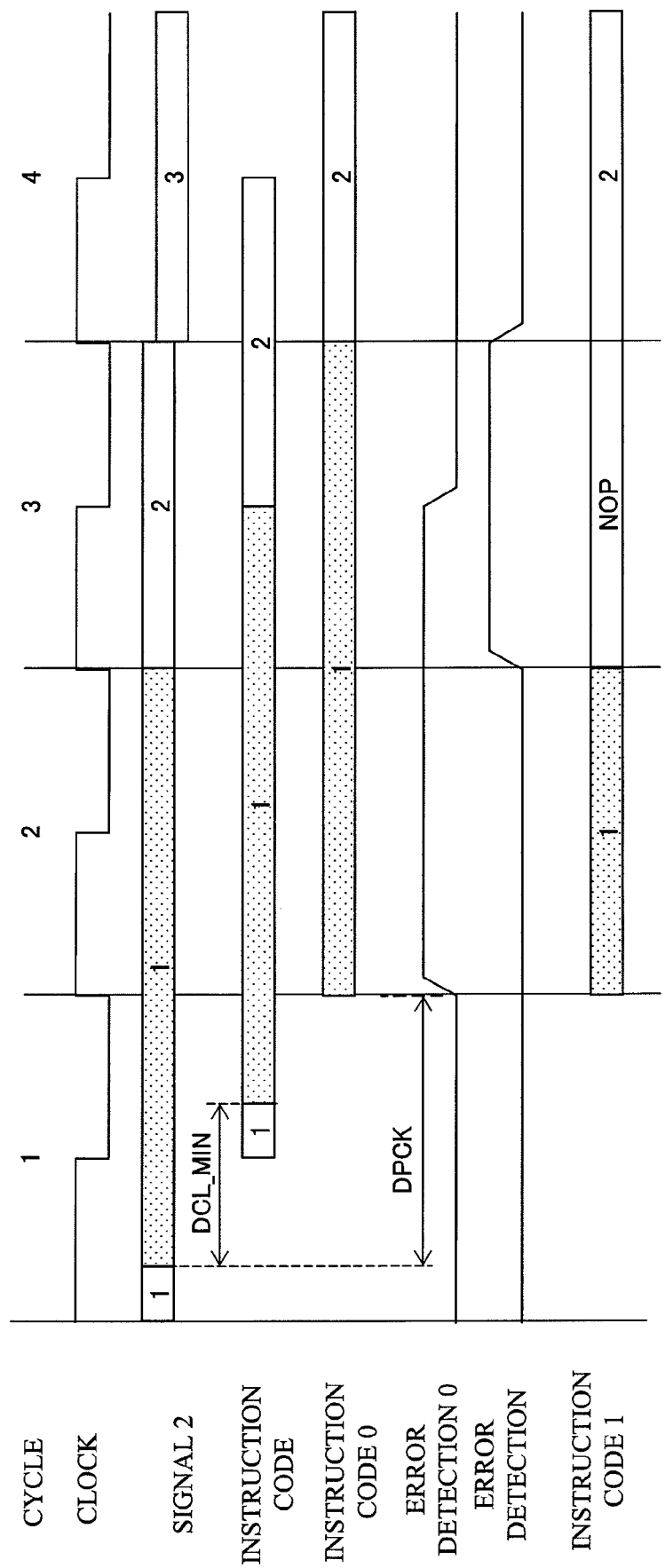
FIG. 4 is a timing chart for reference, showing an operation example in which a condition that DPCK is less than DCL_MIN is not satisfied in one embodiment of the present invention.
Figure 5:
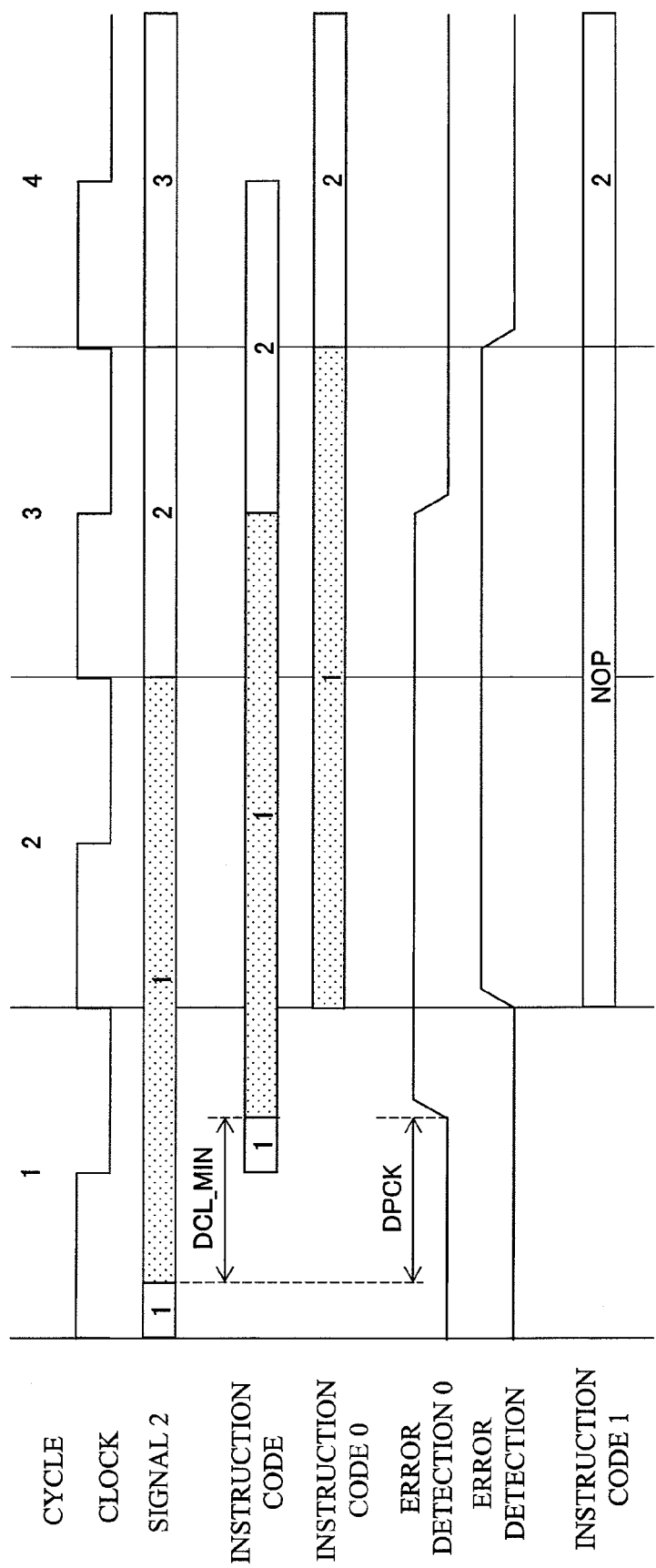
FIG. 5 is a timing chart showing an operation example in which a condition that DPCK is less than DCL_MIN is satisfied in one embodiment of the present invention.

Subsequently, referring to FIGS. 4 and 5, examples of operation in the configuration of FIG. 3 will be described. In one example, a condition in which the DPCK is less than or equal to DCL_MIN is satisfied. In another example, the condition is not satisfied. FIG. 4 is a timing chart showing the operation example not satisfying the condition in which the DPCK is less than or equal to the DCL_MIN for reference sake. FIG. 5 is a timing chart showing the operation example satisfying the condition where the DPCK is less than or equal to the DCL_MIN. Here, a case in which the delay of the CL2 (3022) is minimized will be shown.

In FIG. 4 (reference), when an error occurs in the FF (3002) at a cycle 1 (a state of the error occurring is shown by hatching), this error is propagated to the instruction code 0 (3042) through the signal 2 (3012) and the instruction code (5). Here, by using the error detection (3), the error of the instruction code 0 (3042) is masked and nullified, and is outputted to the instruction code 1 (2010), but since the DPCK is not less than or equal to the DCL_MIN, the assertion of error detection (3) may be made at a cycle 3, and in such a case, at a cycle 2, an error is propagated to the instruction code 1 (2010) at cycle 2.

In FIG. 5, when an error occurs in the FF (3002) at the cycle 1, this error is propagated to the instruction code 0 (3042) through the signal 2 (3012) and the instruction code (5). Here, by using the error detection (3), the error of the instruction code 0 (3042) is masked and nullified, and is outputted to the instruction code 1 (2010), but if the DPCK is less than or equal to the DCL_MIN, the assertion timing of the error detection (3) is guaranteed to match the timing on which the error is propagated to the instruction code 0 (3042), and as a result, the error propagation to the instruction code 1 (2010) in the cycles 2 to 3 can be inhibited.

Figure 6:
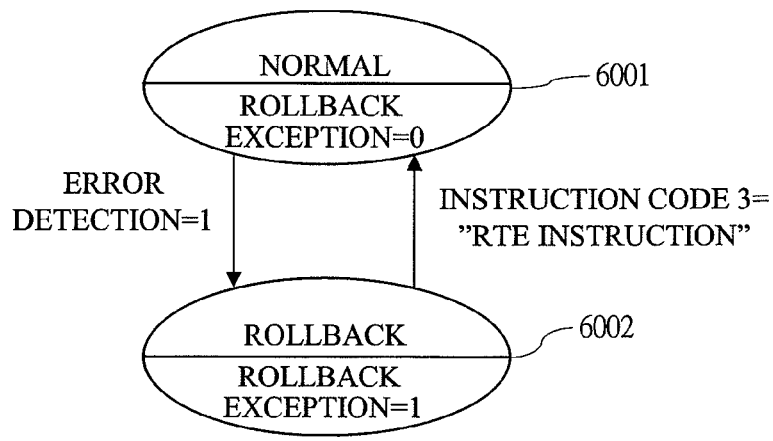
FIG. 6 is a state transition diagram of a rollback state machine in one embodiment of the present invention.

Subsequently, referring to FIG. 6, a state transition of the rollback state machine (2002) will be described. FIG. 6 is a state transition diagram of the rollback state machine (2020).

The rollback state machine (2002) consists of two states of a NORMAL state (6001) showing that the CPU is executing the normal instructions and a ROLLBACK state (6002) showing that the CPU is processing a rollback exceptional routine. The rollback exception (8), the output of the rollback state machine (2002), becomes "0" in the NORMAL state (6001), and "1" in the ROLLBACK state (6002).

The transition conditions between each states are described below. When the error detection (3)=1, transition from the NORMAL state (6001) to the ROLLBACK state (6002) is performed, and when the instruction code 3 (2002) is a RTE instruction (instruction to return from exception routine), transition from the ROLLBACK state (6002) to the NORMAL state (6001) is performed. Note that, the initial state of the ROLLBACK state machine (2002) is taken as the NORMAL state (6001).

Figure 7:
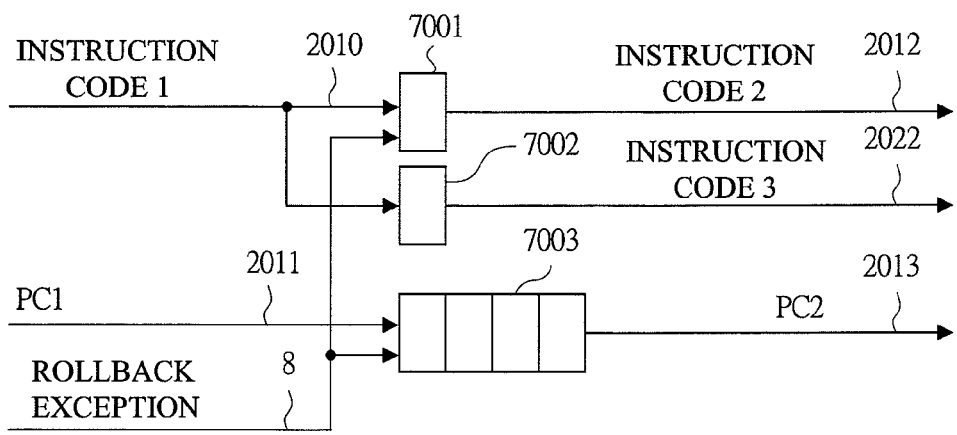
FIG. 7 is a detailed view showing an instruction queue in one embodiment of the present invention.

Subsequently, referring to FIG. 7, the detail of the instruction queue (2003) will be described. FIG. 7 is a detailed view showing the instruction queue (2003).

The instruction queue (2003) is configured by 1-FIFOs (7001 and 7002) and a 4-FIFO (7003) and the like.

The instruction code 1 (2010) is delayed by the 1-FIFO (7001), and is outputted to the instruction code 2 (2012). And, the instruction code 1 (2010) is delayed by the 1-FIFO (7002), and is outputted to instruction code 3 (2022) for the state transition of the rollback state machine (2002). Further, the PC 1 (2011) is delayed by the 4-FIFO (7003), and is outputted to the PC 2 (2013). Renewal of the 1-FIFO (7001) and the 4-FIFO (7003) are inhibited by the assertion of the rollback exception (8), and all the contents are cleared by negate.

Figure 8:
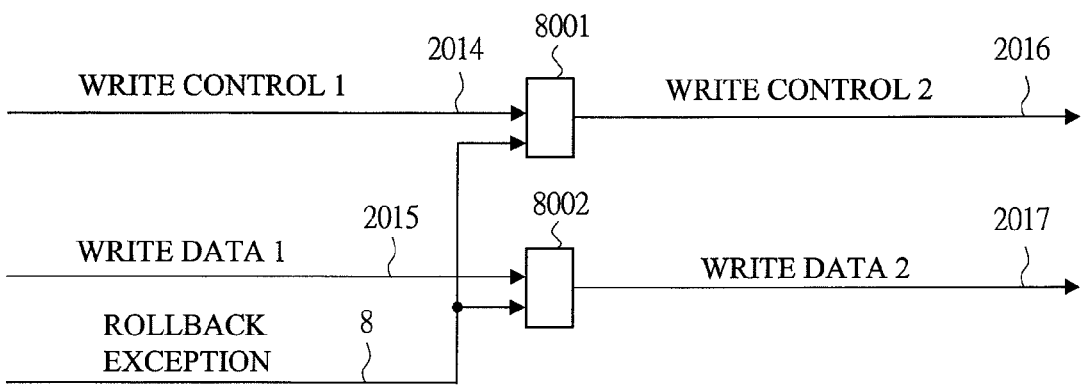
FIG. 8 is a detailed view showing a store queue in one embodiment of the present invention.

Subsequently, referring to FIG. 8, the detail of the store queue (2004) will be described. FIG. 8 is a detailed view showing the store queue (2004).

The store queue (2004) is configured by the 1-FIFOs (8001 and 8002) and the like.

The write control 1 (2014) and the write data 1 (2015) are delayed by the 1-FIFO (8001) and the 1-FIFO (8002), respectively, and are outputted to the write control 2 (2016) and the write data 2 (2017), respectively. The 1-FIFO (8001) and the 1-FIFO (8002) are nullified in content by the assertion of the fallback exception (8).

Figure 9:
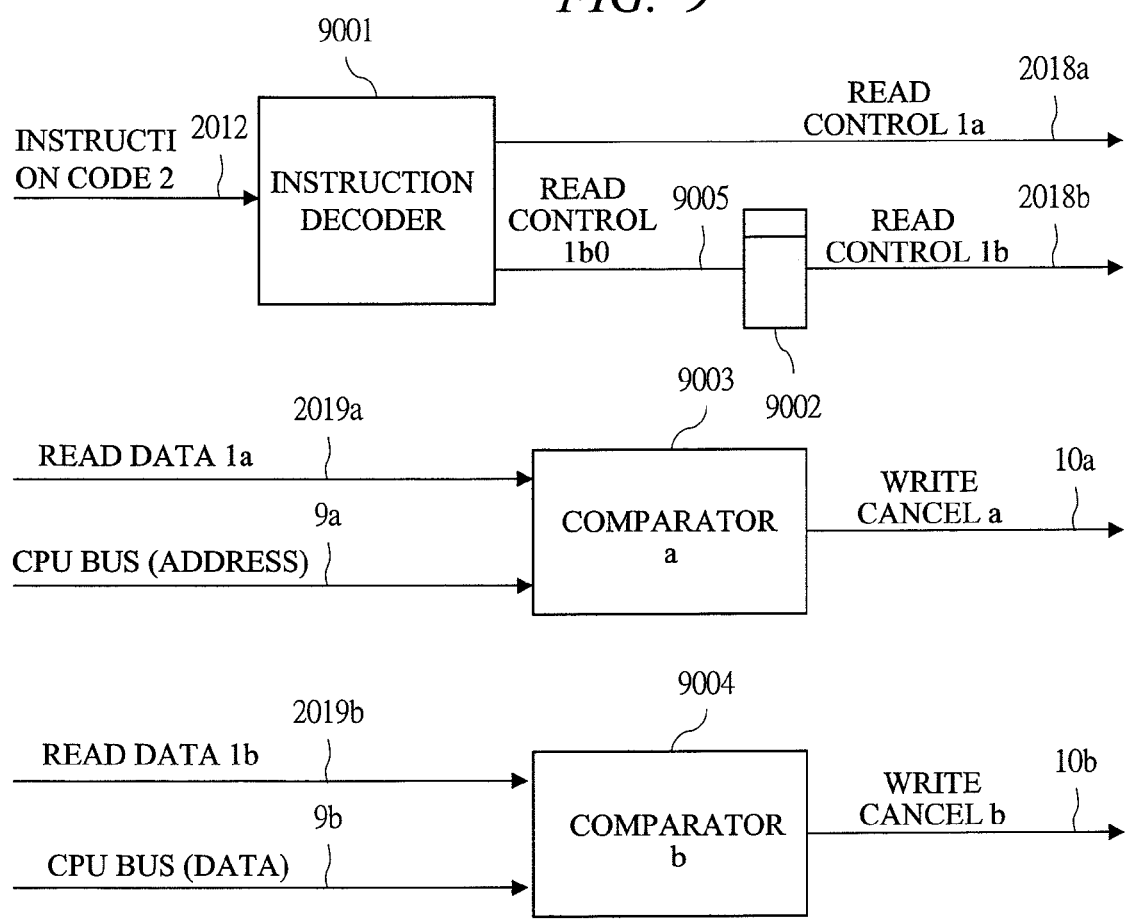
FIG. 9 is a detailed view showing a CPU bus error detector in one embodiment of the present invention.

Subsequently, referring to FIG. 9, the detail of the CPU bus error detector (2006) will be described. FIG. 9 is a detailed view of the CPU bus error detector (2006).

The CPU bus error detector (2006) is configured by a instruction decoder (9001), a FF (9002), comparators a and b (9003 and 9004), and the like.

The instruction decoder (9001) decodes the instruction code 2 (2012), and decides whether it is an instruction to generate a write to the CPU bus write or not. Moreover, the instruction decoder (9001), as a result of decoding the instruction code 2 (2012), if it is an instruction to generate a write to the CPU bus, outputs the general purpose register number storing the write address to a read control 1a (2018a), and the register number storing the write data to a read control 1b0 (9005). The read control 1b0 (9005) is delayed by the FF (9002), and is outputted to a read control 1b (2018b). Note that, in FIG. 2, the read control 1a (2018a) and the read control 1b (2018b) are put together and designated as the read control 1 (2018).

The content of the register of the delayed register file (2007) pointed by the read control 1a (2018a) is read by a read data 1a (2019a), and is compared with a CPU bus (address)

(9*a*) by the comparator a (9003). As a result of the comparison, if any mismatch exists, a write cancel a (10*a*) is asserted.

Similarly, the content of the register of the delayed register file (2007) pointed by the read control 1*b* (2018*b*) is read by a read data 1*b* (2019*b*), and is compared with a CPU bus (data) (9*b*) by the comparator b (9004). As a result of the comparison, if any mismatch exists, a write cancel b (10*b*) is asserted.

Note that, in FIG. 2, the read data 1*a* (2019*a*) and the read data 1*b* (2019*b*) are put together and designated as the read data 1 (2019). Further, the write cancel a (10*a*) and the write cancel b (10*b*) are put together and designated as the write cancel (10).

Figure 10:
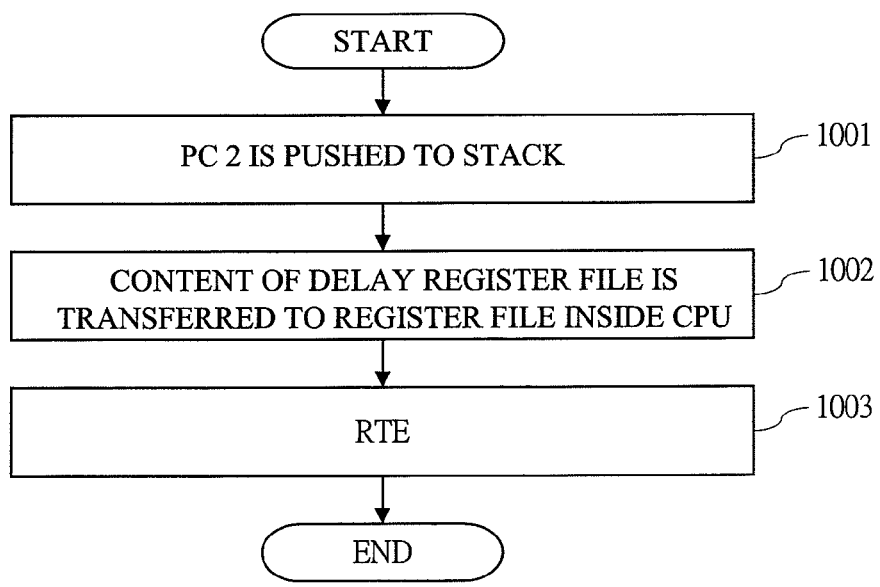
FIG. 10 is a flowchart showing a rollback exception routine in one embodiment of the present invention.

Subsequently, referring to FIG. 10, a flow of the rollback exception routine will be described. FIG. 10 is a flowchart showing the rollback exception routine.

At first, at a step (1001), the PC 2 is read, and is pushed to a stack. Next, at a step (1002), the content of the delayed register file is transferred to the register file inside the CPU. Finally, at a step (1003), return from the exception processing is executed by the RTE instruction. At the step (1001), since the PC 2 is pushed to the stack, a return destination by the RTE instruction is an address pointed by the PC 2.

Figure 11:
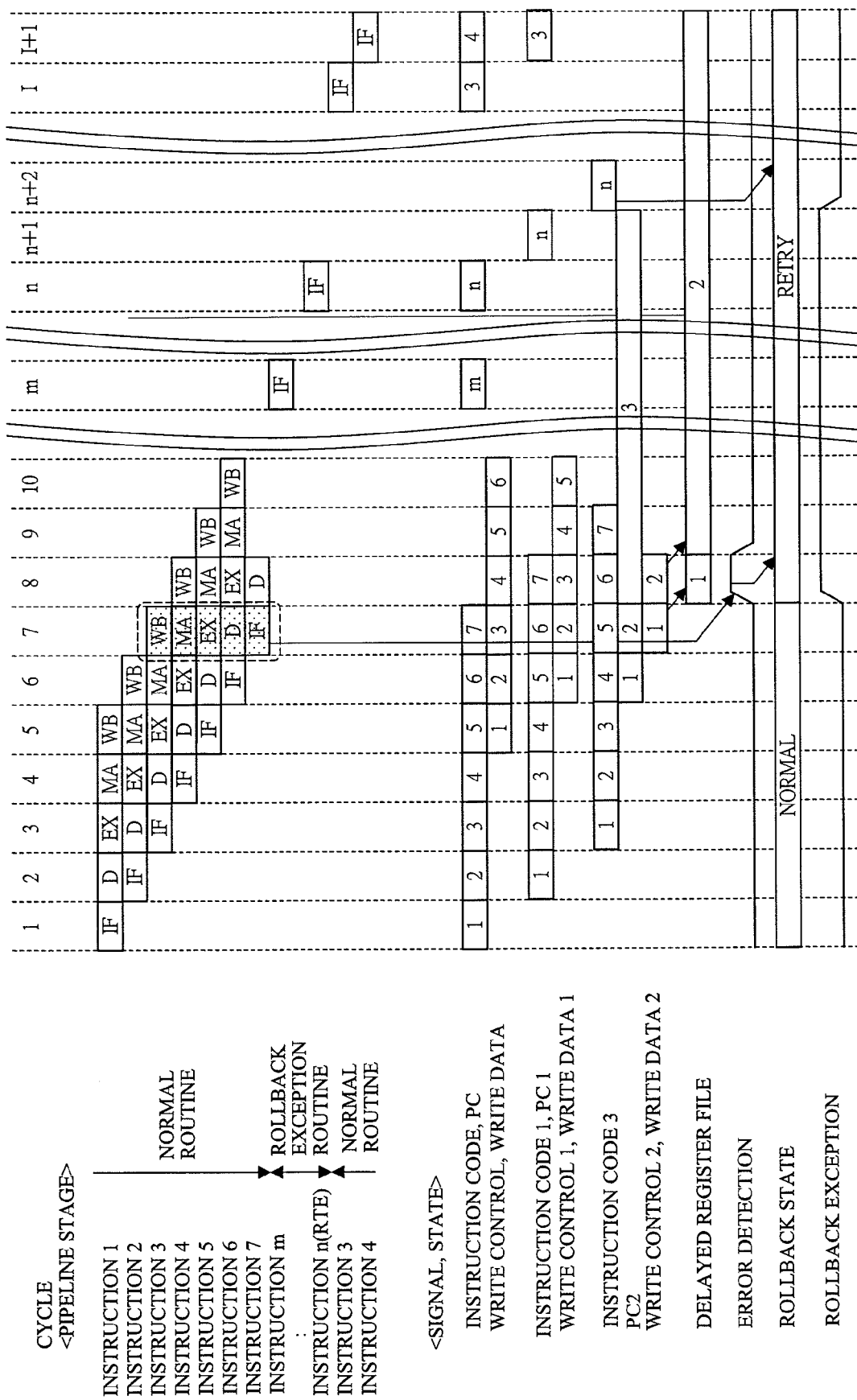
FIG. 11 is a timing chart showing an example of a rollback operation in one embodiment of the present invention.

Subsequently, referring to FIG. 11, an example of the rollback operation in the present embodiment will be described. FIG. 11 is a timing chart showing an example of the rollback operation. At the upper part of FIG. 11 shows a pipeline stage of the CPU, and at the lower part shows the signal and the state of the rollback control unit.

First, the instruction proceeds normally from a cycle 1 to 6, and each content of the instruction code, the instruction code 1, the instruction code 3, the PC, the PC 1, the PC 2, the write control, the write control 1, the write control 2, the write data, the write data 1, the write data 2, the delayed register file is renewed.

Note that, in FIG. 11, notations of these signals and states correspond to instruction numbers. In the instruction code, the instruction code 1, and the instruction code 3, "1" represents the instruction code of the instruction 1. In the PC, the PC 1, and the PC 2, "1" represents a PC corresponding to the instruction 1, that is, the address of the instruction 1. And, in the write control, the write control 1, and the write control 2, "1" represents the register number of the write back target of the instruction 1. Further, in the write data, the write data 1, and the write data 2, "1" represents the write back data to the register of the instruction. And, in the delayed register file, "1" shows that the registers of contents after the execute completion of the instruction 1 is stored.

Next, at a cycle 7, an error occurs in a FF inside the CPU. Here, the pipeline stage likely to malfunction by an error is shown by hatching.

Next, at a cycle 8, an error detection is asserted. At the same cycle, the rollback state transits from "NORMAL" to "ROLLBACK", and corresponding to this transition, the rollback exception is asserted. And, the CPU receives the assertion of the rollback exception, stop the instruction 7, and braches into the rollback exception routine. Note that, the CPU in the present embodiment stops the instruction on the D stage of the pipeline when the rollback exception is asserted, and branches into the exception routine. And, the rollback exception is the highest priority exception, and during the rollback exception processing, does not receive any exceptions including the rollback exception.

Next, the rollback exception routine starts from a cycle m, and executes the processing as described in FIG. 10. In the rollback exception routine, the address of the instruction 3 is read from the PC 2, and pushed to the stack. The content of the execute completion state of the instruction 2, stored in the delayed register file is transferred to the register file inside the CPU.

Next, at a cycle n, the RTE instruction which is the instruction to return from the exception processing routine is read. At the subsequent cycle n+2, the instruction code of the RTE is outputted to the instruction code 3, and the rollback state transits from the "ROLLBACK" to the "NORMAL".

Next, by the execution of the RTE instruction, the instruction is re-executed from the instruction 3 at the cycle 1.

As described above, an arbitrary error in the CPU is detected by a simple control in the present embodiment, and the content of the register is restored into the instruction execution termination state preceding to the instruction range likely having malfunctioned by the error, and the instruction can be roll backed to the beginning of the instruction range likely having malfunctioned by the error.

Figure 12:
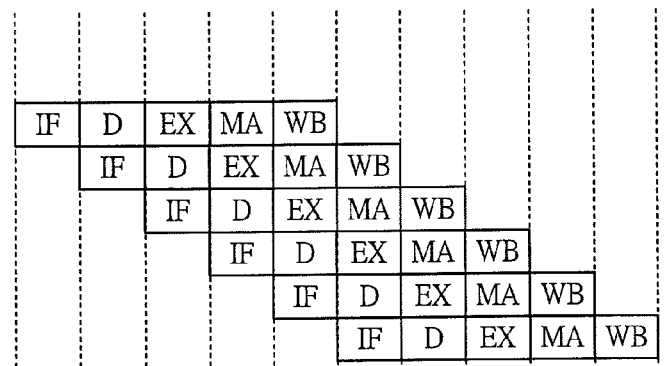
FIG. 12 is a timing chart showing an operation example of preventing an erroneous CPU bus write in one embodiment of the present invention.
Figure 12:
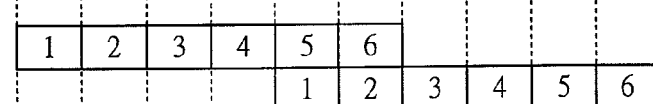
Figure 12:
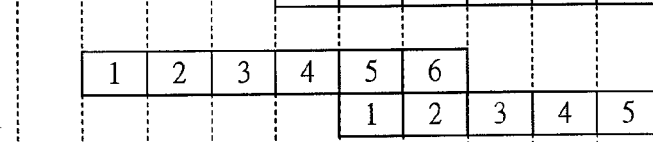
Figure 12:
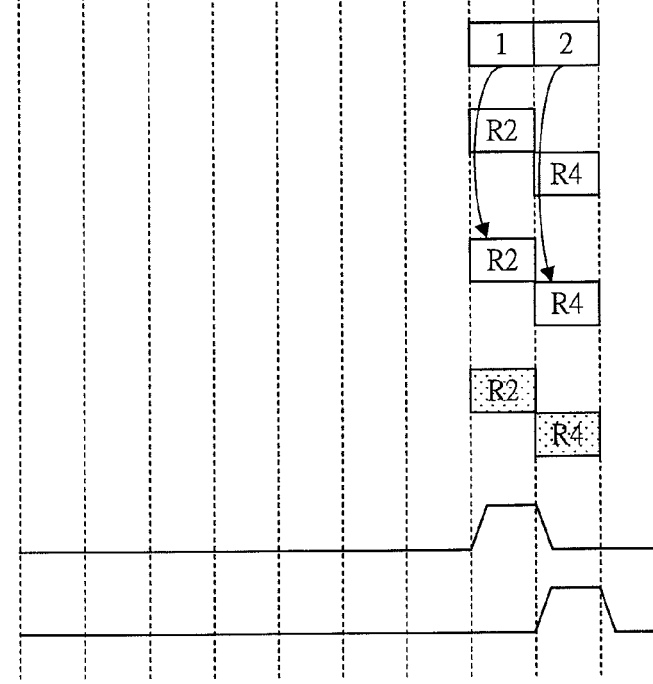

Subsequently, referring to FIG. 12, an example of an operation inhibiting an erroneous CPU bus write in the present embodiment will be described. FIG. 12 is a timing chart showing an example of the operation inhibiting the erroneous CPU bus write. At the upper part of FIG. 12 is showing the pipeline of the CPU, and at the lower part is showing the signal and the state of the rollback control unit.

Note that, the notations of the instruction code, the instruction code 1, the instruction code 2, the write control, the write control 1, the write control 2, the write data, the write data 1, the write data 2, and the delayed register file in FIG. 12 shall be the same as FIG. 11. Further, the notations of the read control 1*a*, the read control 1*b*, the read data 1*a*, the read data 1*b*, the CPU bus (address), and the CPU bus (data) shows that the content of the corresponding general purpose register is outputted.

Here, an example of inhibiting an error of a CPU bus write instruction "MOV R4, @R2" of the instruction 6 will be described. Note that, the "MOV R4, @R2" is an instruction to write the value of the general purpose register R4 on the address pointed by the general purpose register R2. To use the functions of inhibiting the erroneous CPU bus write according to the present embodiment, the contents of the R2 and the R4 which are source operands of the instruction 6 are generated, respectively by the instruction 1 and the instruction 2.

First, the instruction proceeds from a cycle 1 to 7, and each content of the instruction code, the instruction code 1, the instruction code 2, the write control, the write control 1, the write control 2, the write data, the write data 1, the write data 2, and the delayed register file is renewed.

Next, at a cycle 8, the erroneous write address is outputted by the instruction 6. Here, since the content of the R2 is generated by the instruction 1, five instructions previous to the instruction 6, the delayed register file holds the execute completion state of the instruction 1, and the content of the R2 can be read from the delayed register file. The CPU bus error comparator (2006) described in FIG. 9 detects a mismatch between the content of the read R2 and the content of the CPU bus (address), and asserts the write cancel a.

Next, at a cycle 9, the erroneous write data is outputted by the instruction 6. Here, since the content of the R4 is generated by the instruction 2, four instructions previous to the instruction 6, the delayed register file holds the execute completion state of the instruction 2, and the content of the R4 can be read from the delayed register file. The CPU bus error comparator (2006) described in FIG. 9 detects a mismatch between the content of the read R4 and the content of the CPU bus (data), and asserts the write cancel b.

A CPU bus target module (11), such as an embedded RAM, requires a function of inhibiting its write when the write cancel is asserted. Similarly to the operation as described above, since its cancel is asserted at the timing on which erroneous address and data are outputted to the CPU bus, the function of inhibiting its write using this cancel signal can be implemented in the CPU bus target module (11) by a simple control.

As described above, according to the present embodiment, the erroneous write on the CPU bus by the error of the CPU can be inhibited by a simple control.

Thus, while the invention carried out by the present inventors have been specifically described based on the embodiment, the present invention is not limited to the above described embodiment, but it goes without saying that various modifications are possible within the scope of the invention.

The present invention relates to an error correction technique of performing a rollback control, and in particular, it is effective in application to an error correction method of a CPU by an instruction level rollback in the CPU performing a pipeline structure.

What is claimed is:

1. An error correction method, comprising:
    detecting an error in a CPU bus write instruction in a CPU with a pipeline structure by a CPU bus error detector;
    restoring, via a rollback control unit, a content of a register file from a delayed register file which holds the content of the register file at a time when an Instruction N was executed correctly before the error; and
    re-executing, with rollback control, via a rollback control unit, an Instruction N+1 which is the next instruction after the Instruction N,
    wherein the CPU and the rollback control unit are connected to one another via a bus,
    wherein the CPU bus error detector decodes the CPU bus write instruction, and obtains an index of a register Ra which holds a write address of the CPU bus write instruction, and an index of a register Rd which holds write data of the CPU bus write instruction and compares the write address and write data outputted to the CPU bus with the value of Ra and Rd in the delayed register file, and
    wherein instructions for setting the write address and write data to register Ra and register Rd are allocated so that the write address and write data are set to registers Ra and Rd in the delayed register file before the CPU bus write instruction is executed.

2. An error correction method for an information processing unit, which comprises a CPU with pipeline structure and a rollback control unit connected to the CPU via a bus, said method comprising:
    when an error is detected, restoring a content of a register file from a delayed register file which holds an execute completion state of an [Instruction N] correctly executed before this error; and
    re-executing an instruction from an [Instruction N+1] which is the next instruction after the [Instruction N]
    wherein:
    the CPU includes a plurality of first flip flops, a parity check circuit and a second flip flop,
    the rollback control unit include an error mask circuit,
    the error mask circuit includes a plurality of mask logistics,
    wherein output signals of the plurality of first flip flops are input to the parity check circuit, the parity check circuit inputs a signal obtained by collecting parity check results of each output signal by logical add to the second flip flop, and the second flip flop outputs an error detection signal, and
    when the error detection signal is a predetermined value, the plurality of mask logics make an address, an instruction code, a write control and a write data into invalid values.

3. The error correction method according to claim 2,
    wherein the [instruction N+1] is an instruction decoded first by the CPU among at least one or more instructions executed at the timing on which the error occurs.

4. The error correction method according to claim 2,
    wherein a CPU signal inputted to the rollback control unit nullifies the CPU signal delayed by a latency portion of the error detection signal with the error detection signal, and
    an output delay of the error detection signal is adjusted to be less than the minimum value of the output delay of the CPU signal.

5. An information processing unit for performing an error correction method, comprising:
    a CPU with pipeline structure; and
    a rollback control unit connected to the CPU via a bus which, when an error is detected, restores a content of a register file from a delayed register file which holds an execute completion state of an [Instruction N] correctly executed before this error and re-executes an instruction from an [Instruction N+1] which is the next instruction after the [Instruction N],
    wherein:
    the CPU includes a plurality of first flip flops, a parity check circuit and a second flip flop,
    the rollback control unit includes an error mask circuit,
    the error mask circuit includes a plurality of mask logics,
    output signals of the plurality of first flip flops are input to the parity check circuit, the parity check circuit inputs a signal obtained by collecting parity check results of each output signal by logical add to the second flip flop, and the second flip flop outputs an error detection signal, and
    when the error detection signal is a predetermined value, the plurality of mask logics make an address, an instruction code, a write control and a write data into invalid values.

6. The information processing unit according to claim 5,
    wherein the [instruction N+1] is an instruction decoded first by the CPU among at least one or more instructions executed at the timing on which the error occurs.

7. The information processing unit according to claim 5,
    wherein a CPU signal inputted to the rollback control unit nullifies the CPU signal delayed by a latency portion of the error detection signal with the error detection signal, and
    an output delay of the error detection signal is adjusted to be less than the minimum value of the output delay of the CPU signal.

8. An information processing unit for performing an error correction method, comprising:
    a CPU with pipeline structure; and
    a rollback control unit connected to the CPU via a bus, which, when an error is detected, restores a content of a register file from a delayed register file which holds an execute completion state of an [Instruction N] correctly executed before this error and re-executes an instruction from an [Instruction N+1] which is the next instruction after the [Instruction N],
    wherein:
    the rollback control unit includes a CPU bus error detector which detects an error of a CPU bus write accompanied with execution of an instruction subsequent to the error occurrence, the CPU bus error detector has a plurality of comparators, and read data from the delayed register file and address data on the CPU bus are compared by the plurality of comparators and a bus write cancel is issued based on the comparison result.

9. The information processing unit according to claim 8, wherein an instruction for generating a content of a source operand is disposed before the instruction accompanied with the CPU bus write so that the source operand of the instruction accompanied with the CPU bus write is reflected on the delayed register file before the CPU bus write, and the error of the CPU bus write is detected by using the read value of the delayed register file and the CPU bus write related to the detected error is cancelled.

* * * * *